UNITED STATES PATENT OFFICE.

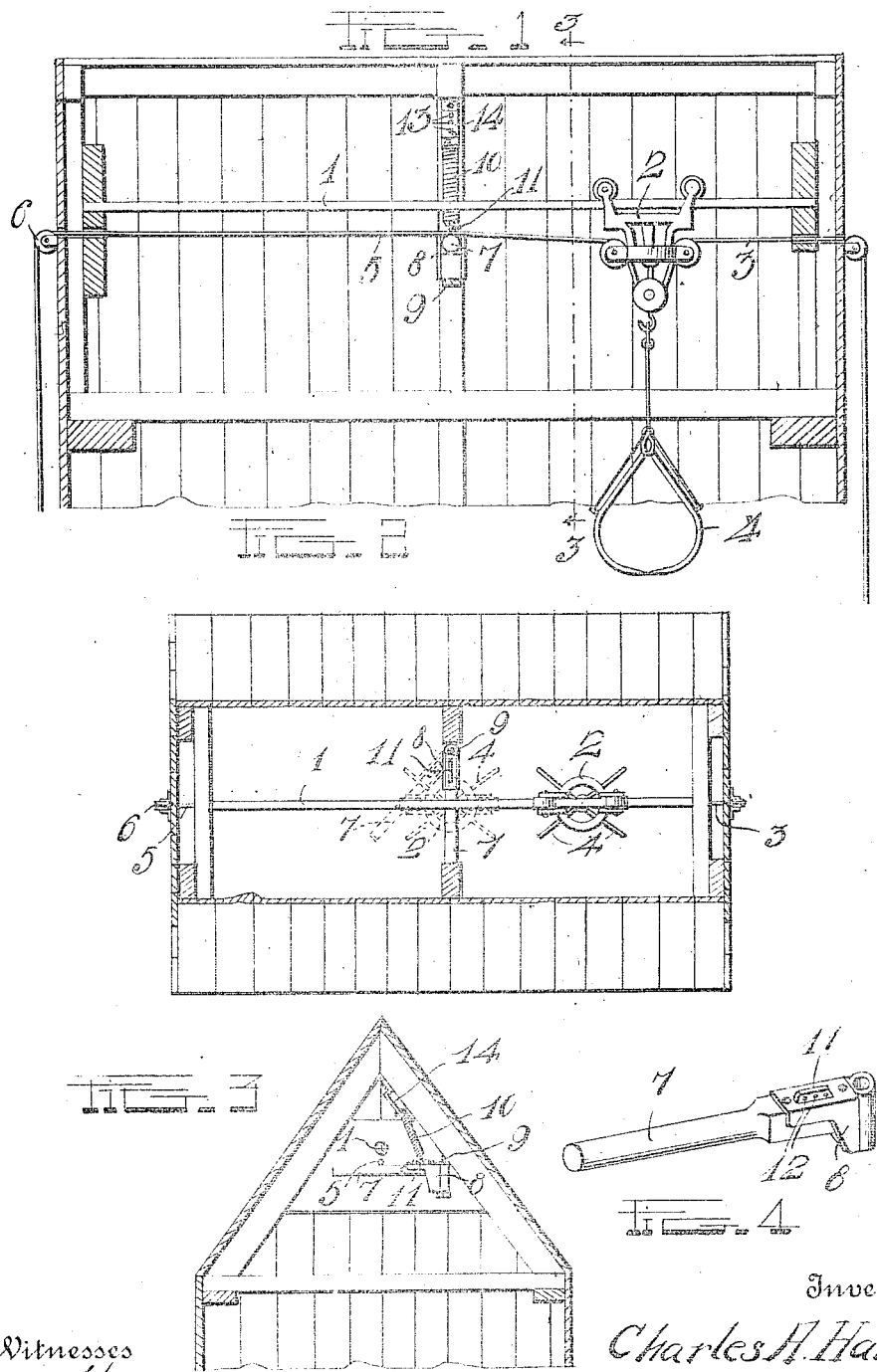

CHARLES A. HANSON, OF DONOVAN, ILLINOIS.

ROPE-SUPPORTING DEVICE FOR HAY-ELEVATORS.

979,665.

Specification of Letters Patent.    Patented Dec. 27, 1910.

Application filed June 13, 1910. Serial No. 566,569.

*To all whom it may concern:*

Be it known that I, CHARLES A. HANSON, a citizen of the United States, residing at Donovan, in the county of Iroquois and State of Illinois, have invented certain new and useful Improvements in Rope-Supporting Devices for Hay-Elevators; and I do declare the following to be a full, clear, and exact description of the invention, such as will enable others skilled in the art to which it appertains to make and use the same.

This invention relates to improvements in rope supporting devices for hay elevators.

One object of the invention is to provide a simple and inexpensive rope support adapted to be readily arranged and secured in position to support the slack rope of the elevator.

Another object is to provide a device of this character which will readily swing out of the way when engaged by the hay carriage to permit the latter to pass and will automatically swing back to an operative position after the carriage has passed.

With these and other objects in view the invention consists of certain novel features of construction, combination and arrangement of parts as will be more fully described and particularly pointed out in the appended claim.

In the accompanying drawings: Figure 1 is a vertical longitudinal section through the upper portion of a barn with a hay elevator arranged therein showing the application of my improved rope support; Fig. 2 is a horizontal sectional view through the upper portion of the barn taken above the elevator mechanism and showing the rope support in operative position in full lines, and in dotted lines showing the manner in which the support is swung to one side by the carrier to permit the latter to pass; Fig. 3 is a vertical cross section on the line 3—3 of Fig. 1; Fig. 4 is a detail perspective of the rope support.

In the accompanying drawings is shown a hay elevator arranged in the upper portion of a barn and consisting of a longitudinally disposed track bar 1 which extends from one end to the other of the barn and has slidably mounted thereon a hay carrier 2 which may be of any suitable form and to which is connected the usual hoisting or elevator rope 3 carrying the usual hay fork or grapple 4. To the carriage is also connected the operating rope 5 by means of which the carriage is drawn along the track to bring the load of hay hoisted by the grapple or fork to the desired place in the mow. The rope 5 passes over a guide pulley 6 at one end of the barn and thence downwardly to a position within reach of the operator. The foregoing parts may be of the usual or of any suitable construction and do not form a part of the present invention.

In the hay elevators and carriers of the class described the slack in the hoisting and operating ropes causes the latter to sag down onto the hay when the carriage is moved back and forth over the track thereby greatly interfering with the operation of mowing the hay away and in order to overcome this objection I have provided means for holding or supporting these ropes in an out of the way position. My improved rope supporting device comprises an arm or bar 7 having on its inner end a bearing bracket 8 formed with an enlargement containing a bearing eye to engage a pivot stud 9 which depends from one of the roof rafters of the barn. The arm 7 when thus arranged will project outwardly across the upper portion of the barn below the track bar 1 and transversely with respect to the same. When in this position the bar or arm 7 will catch on the operating or hoisting rope when drawn over the same thus supporting or holding said rope up in an out of the way position.

By pivotally mounting the arm 7 the same will be swung around in one direction or the other when engaged by the approaching hay carrier thus permitting the latter to pass by the arm. After the carriage has thus passed the arm, the latter will be immediately swung back to its normal or operative position by means of a coiled spring 10, one end of which is adjustably secured to the inner portion of the arm by engaging one of the hook-shaped ends of the spring with one of a series of apertures 12 formed in a longitudinally extending rib or lug 11 formed on top of the bracket 8. The opposite end of the spring is adjustably secured in one of a series of apertures 13 formed in a U-shaped fastening plate 14 secured to and spaced a suitable distance from one of the roof rafters as clearly shown in the drawings. By connecting the spring in the manner described the latter may be adjusted to the desired tension and will quickly swing the arm back to its normal position, which is at right angles to the track 1, after being swung around in either direction by the engagement of the carriage therewith.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

A rope support for hay elevators comprising a bar arranged to extend under the rope transversely thereof and provided at one end with an enlargement having a vertically disposed bearing eye at its extremity, and a longitudinally disposed perforated rib on its upper side, a pivot pin inserted through the bearing eye and secured in a fixed support at one side of the rope, and a spring having one end secured in a perforation in the said rib and its upper end secured to the fixed support above the bar.

In testimony whereof I have hereunto set my hand in presence of two subscribing witnesses.

CHARLES A. HANSON.

Witnesses:
G. C. EDMUNDS,
JOHN S. FOSTER.